(12) United States Patent
Near

(10) Patent No.: US 10,990,685 B2
(45) Date of Patent: Apr. 27, 2021

(54) STATIC SOFTWARE ANALYSIS TOOL APPROACH TO DETERMINING BREACHABLE COMMON WEAKNESS ENUMERATIONS VIOLATIONS

(71) Applicant: Spectare Systems, Inc., Titusville, NJ (US)

(72) Inventor: Christopher D. Near, Titusville, NJ (US)

(73) Assignee: Spectare Systems, Inc., Palo Alto, CA (US)

( * ) Notice: Subject to any disclaimer, the term of this patent is extended or adjusted under 35 U.S.C. 154(b) by 293 days.

(21) Appl. No.: 16/177,721

(22) Filed: Nov. 1, 2018

(65) Prior Publication Data

US 2020/0104510 A1 Apr. 2, 2020

Related U.S. Application Data

(60) Provisional application No. 62/665,874, filed on May 2, 2018.

(51) Int. Cl.
*G06F 21/57* (2013.01)
*G06F 8/41* (2018.01)
*G06F 11/07* (2006.01)
*G06F 11/36* (2006.01)

(52) U.S. Cl.
CPC ............ *G06F 21/577* (2013.01); *G06F 8/427* (2013.01); *G06F 11/079* (2013.01); *G06F 11/3608* (2013.01)

(58) Field of Classification Search
CPC ...... G06F 21/577; G06F 8/427; G06F 11/079; G06F 11/3608; G06F 11/00; G06F 12/14

USPC .......................................................... 726/25
See application file for complete search history.

(56) References Cited

U.S. PATENT DOCUMENTS

| | | | | |
|---|---|---|---|---|
| 7,284,274 | B1 * | 10/2007 | Walls | G06F 8/70 726/25 |
| 7,711,576 | B1 * | 5/2010 | Duett | G06Q 10/06 705/1.1 |
| 9,400,889 | B2 * | 7/2016 | Chess | G06F 21/563 |
| 9,525,698 | B2 * | 12/2016 | Crosby | H04L 63/1433 |
| 9,798,884 | B1 * | 10/2017 | Bishop, III | G06N 20/00 |
| 10,324,820 | B2 * | 6/2019 | Pistoia | G06F 11/3604 |
| 10,402,584 | B1 * | 9/2019 | Kopylov | G06F 21/577 |
| 10,540,502 | B1 * | 1/2020 | Joyce | G06F 21/552 |
| 2009/0113248 | A1 * | 4/2009 | Bock | G06F 11/0748 714/39 |

(Continued)

FOREIGN PATENT DOCUMENTS

| WO | WO 2017/180666 A1 | 10/2017 | |
|---|---|---|---|
| WO | WO-2017180666 A1 * | 10/2017 | ............ G06F 11/302 |
| WO | WO 2019/212757 A1 | 11/2019 | |

OTHER PUBLICATIONS

International Search Report PCT/US2019/28157 dated Jul. 17, 2019.

*Primary Examiner* — Badrinarayanan Champakesan
(74) *Attorney, Agent, or Firm* — Arnold & Porter Kaye Scholer

(57) ABSTRACT

A method to use static software analysis tools to determine breachable common weakness enumerations within software source code by avoidance of non-breachable situations which allows for the classification of breachable common weakness enumeration situations into 5 categories, each with a unique means of detection.

10 Claims, 3 Drawing Sheets

(56) References Cited

U.S. PATENT DOCUMENTS

| | | | | |
|---|---|---|---|---|
| 2015/0121532 A1* | 4/2015 | Barel | ................... | G06F 21/577 |
| | | | | 726/25 |
| 2015/0242637 A1* | 8/2015 | Tonn | .................. | H04L 63/1433 |
| | | | | 726/25 |
| 2016/0246965 A1* | 8/2016 | Cornell | ................ | G06F 21/577 |
| 2017/0185783 A1* | 6/2017 | Brucker | .............. | H04L 63/1433 |
| 2017/0212829 A1* | 7/2017 | Bales | ................. | G06F 11/3612 |
| 2017/0300690 A1* | 10/2017 | Ladnai | ................. | G06F 21/554 |
| 2018/0025154 A1* | 1/2018 | Cornell | .............. | H04L 63/1425 |
| | | | | 726/25 |
| 2019/0052665 A1* | 2/2019 | Mahieu | ................... | G06N 3/04 |
| 2019/0114435 A1* | 4/2019 | Bhalla | .................. | G06F 21/577 |
| 2019/0129826 A1* | 5/2019 | Ramesh | ............. | G06F 11/3612 |
| 2019/0205542 A1* | 7/2019 | Kao | ................... | G06Q 10/0635 |
| 2019/0294484 A1* | 9/2019 | Luo | .................... | G06F 11/0739 |
| 2019/0303585 A1* | 10/2019 | Ofek | .................... | G06F 21/577 |

\* cited by examiner

STATIC SOFTWARE ANALYSIS TOOL APPROACH TO DETERMINING BREACHABLE COMMON WEAKNESS ENUMERATIONS VIOLATIONS

CROSS-REFERENCE TO RELATED APPLICATION

This application claims the benefit of Provisional Application No. 62/665,874, filed May 2, 2018. Priority to this provisional application is expressly claimed, and the disclosure of the provisional application is hereby incorporated herein by reference in its entirety.

FIELD

The present patent document relates generally to software security applications and, more particularly, to a software analysis tool and method that discovers and removes common weakness enumerations in computer software code.

BACKGROUND

Generally speaking, common weakness enumerations, or CWEs, are essentially the master list of breachable software-based cyber-security issues. As of the date of the filing of this patent document, this list of CWEs is maintained by The MITRE Corporation. Version 3.0 of this list of CWEs was published on or around Nov. 16, 2017. It is believe that this list will be updated as further breachable software-based cyber-security issues are identified. This list is used throughout the cyber-security industry, including by the U.S. Department of Defense (DoD), the U.S. National Institute of Standards and Technology (NIST), the Software Engineering Institute Computer Emergency Response Team (SEI CERT), and the National Security Agency (NSA). SEI CERT refers to this list in all discussions and documentation, but most especially when tracking all known breaches. The CWE list is targeted to developers and security practitioners as a formal list of software weakness types created to serve as a common language for describing software security weaknesses in architecture, design, or code, serve as a standard measuring stick for software security tools targeting these weaknesses, and provide a common baseline standard for weakness identification, mitigation, and prevention efforts. Version 3.0 of the list of CWEs is an 1877-page document that lists 1022 CWEs covering all known types of software breaches across multiple software languages.

Static software analysis is the mathematical analysis of computer software that is performed without running the program that is performed by a static software analysis tool (SAT). In most cases, the analysis is performed on the source code, whereas the analysis can also be performed on object code or on the binary executable. In the methods and systems described in this patent document, source code analysis is preferred, since it is the most accurate, although the methods and systems can be applied to object code or binaries.

Static software analysis can be distinguished from dynamic software analysis. Dynamic software analysis is the analysis of software performed by executing the program. For dynamic program analysis to be effective, the target program must be executed with sufficient number of test inputs to produce interesting behavior. Typically, tens of thousands of test cases are developed for large programs. This quantity of testing, even though it can consume 30-50% of total software development costs, cannot guarantee the determination of all CWEs. By contrast, even for simple programs, static analysis can consider the equivalent of $10^{Billions}$ to $10^{Trillions}$ test cases. Therefore, to successfully guarantee the prevention of cyber breachable events, static analysis is preferred over dynamic analysis.

Current SATs typically have well under 10% coverage (by type) in finding CWEs. A major factor limiting a SAT's CWE coverage is the technically imprecise nature of the CWE description. The descriptions are understandable by a human, but not directly automatable so that a computer processor can process the description to find the CWE.

Currently available SATs are not able to directly determine the majority of CWEs, regardless of accuracy or capability any particular tool. This is because currently available SATs cannot always prove the existence of a CWE. However, the converse is true when using the method and system described herein: SATs with low false negative rates can prove the non-existence of CWEs that are not directly determinable with precision. Other SATs can do the same with varying degrees of scalability and correctness, dependent upon their false negative and false positive rates. There is a need for a software analysis tools that can accurately detect CWEs with a low occurrence of false negative reporting.

SUMMARY

This patent document presents a novel categorization of the CWEs so that they can improve the operation of the processing elements of a computer. It has been found that most CWEs are involved in a chain of events that may or may not lead to a breachable event. The various embodiments described herein map all the possible types of event chains and has created a CWE dependency table. It has been found that for every CWE that is not directly determinable, there is a set of determinable CWEs that are part of all events chain leading to breachable events. With this mapping, a SAT can prove the non-existence of a set of directly determinable CWEs that block non-directly determinable CWE from ever causing a breachable event.

The methods and systems presented in this patent document can apply to any static analysis technique to varying degrees of accuracy, scale, false positive rates, and false negative rates. Software analysis tools considered herein can be and are preferably automated, that is, the tools described herein perform their analysis by a computer, with minimal human intervention, which is the current state of SATs designed to find CWEs. The automated SATs described herein are based on formal methods, such as abstract interpretation, data flow analysis, Hoare logic, model checking, and symbolic execution. The methods of this paper are applicable to any formal method. The methods are also applicable to some of the more comprehensive rule-based SATs.

In one aspect of the embodiments described herein, a method for finding security weaknesses in a software program is described. In this method, a SAT reads the software program into memory of a processing device. Software code is parsed to create parsed code, where the parsed code includes code information needed to perform a static analysis. A set of target common weakness enumerations (CWEs) to discover is determined. Each CWE in the set of target CWEs is identified to be either a code-only (CO) CWE, a root cause (RC) CWE, or a leads to (LT) CWE. A blocking set of CWEs for each RC CWE in the set of target CWEs is identified, wherein each CWE in the blocking set of CWEs for each RC CWE comprises one CO CWE. A blocking set of CWEs for each LT CWE in the set of target CWEs is identified, wherein each CWE in the blocking set of CWEs for each LT CWE comprises one CO CWE. Static analysis of the parsed code is performed to find each CO CWE. Each found CO CWE is reported to a user on a user interface. It is determined if the found CO CWE is within the blocking set of CWEs for each RC CWE, wherein the blocking set of CWEs for each RC CWE is associated with an RC CWE within the set of target CWEs. It is also determined if the found CO CWE is within the blocking set of CWEs for each LT CWE, wherein the blocking set of CWEs for each LT CWE is associated with an RC CWE within the set of target CWEs, each LT CWE being the last CWE in a chain of events that also includes a previously found CWE. Any found RC CWE and LT CWE are reported as not present if no blocking set entry was found for them. RC-CWE and LT CWE are reported as possibly present if one or more blocking set entries was found for them.

In an aspect of the various embodiments described herein, the determination of the set of target CWEs is performed by a formal methods static analysis of the target software code.

In another aspect of the various embodiments described herein, during the identifying each CWE in the set of target CWEs step, the method further determines whether the software code of the software program includes an extra information, directly determinable (XI-DD) CWE and also comprises querying the user for additional information associated with the XI-DD CWE.

In another aspect of the various embodiments, the method also comprises parsing the software code of the software program, and analyzing the software code of the software program for the additional information associated with the XI-DD CWE to determine the presence of XI-DD CWEs.

In another aspect of the various embodiments, the additional information associated with the XI-DD CWE found during the analyzing step is verified by the user.

In another aspect of the various embodiments, software code is graphed for additional accuracy of the static analysis step.

In another aspect of the various embodiments, the performing a static analysis of the parsed code step further comprises determining software behavior associated with a targeted human judgment, directly determinable (HJ-DD) CWE, querying the user for HJ-DD CWE presence based upon the determined software behavior; and recording the discovery of user-determined HJ-CWE.

In another aspect of the various embodiments, LT CWEs are reported that have blocking set entries as potentially present.

In another aspect of the various embodiments, RC-CWEs that have blocking set entries as potentially present are reported.

In another aspect of the various embodiments, the software code is graphed to create a causal graph, a root cause analysis is performed for each found DD CWE from every associated blocking set from each RC CWE reported during the reporting step, and each RC CWE is reported that is identified by the root cause analysis.

In another aspect of the various embodiments, each RC CWE that the root cause analysis identified as having an undeterminable root cause as potentially present is reported.

BRIEF DESCRIPTION OF THE DRAWINGS

The accompanying drawings, which are included as part of the present specification, illustrate the presently preferred embodiments and, together with the general description given above and the detailed description given below, serve to explain and teach the principles of the MTJ devices described herein.

Figure 1:
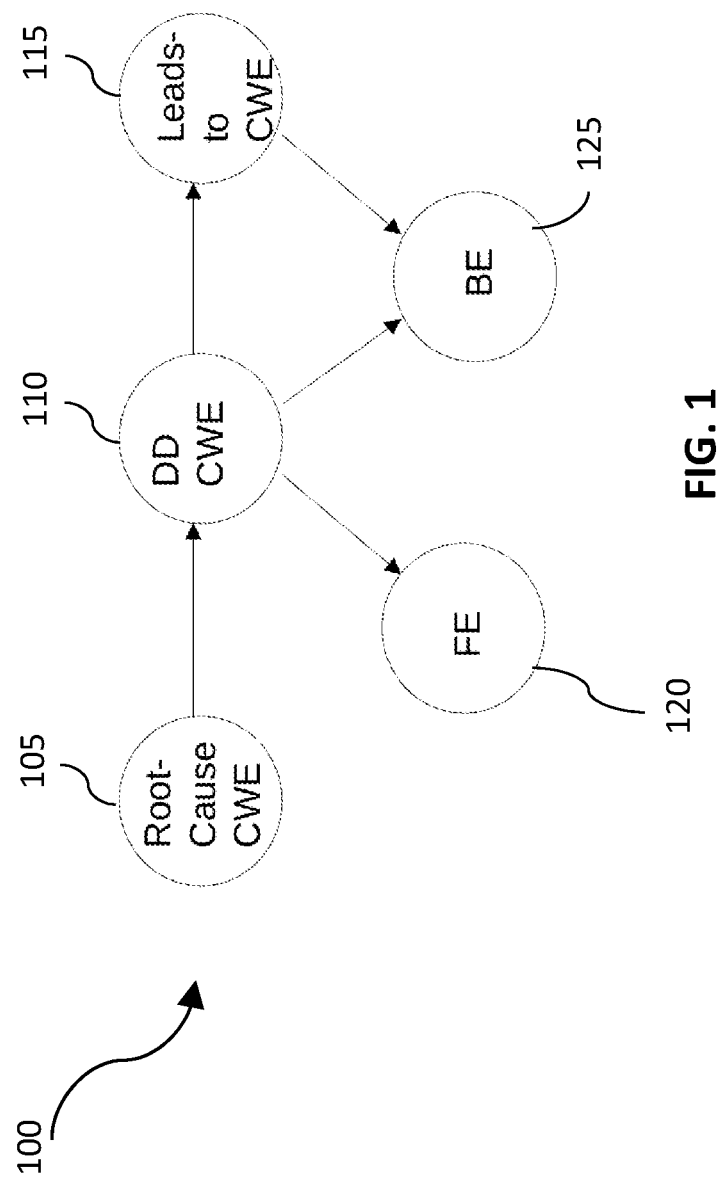
FIG. 1 is state diagram showing how variously classified CWEs lead to breachable events and functional errors.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

The foregoing description of the disclosed embodiments has been presented for the purpose of illustration; it is not intended to be exhaustive or to limit the present disclosure to the precise forms disclosed. Persons skilled in the relevant art can appreciate that many modifications and variations are possible in light of the above disclosure.

Some portions of this description describe the disclosed embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium comprising computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The following description is presented to enable any person skilled in the art to create and use a software analysis tool for detecting common weakness enumerations. Each of the features and teachings disclosed herein can be utilized separately or in conjunction with other features to implement the disclosed system and method. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present teachings. However, it will be apparent to one skilled in the art that these specific details are not required to practice the present teachings.

Currently, no SAT can achieve 100% coverage of CWEs since several CWEs do not rely upon the software code itself. As of the filing of this patent document, there are twenty seven known CWEs that are administrative in nature and are therefore beyond a SAT's scope. Examples of these administrative CWEs are CWE 11 (use of a debuggable binary), CWE 294 (Authentication Bypass by Capture-replay), CWE 540 (Information Exposure Through Source Code), CWE 528 (Exposure of Core Dump File to an Unauthorized Control Sphere), and CWE 530 (Exposure of Backup File to an Unauthorized Control Sphere). Throughout the remainder of this patent document, only the non-administrative CWEs are considered. As described herein, when administrative CWEs are removed from the list, the remaining CWEs can always be classified into one of three newly-defined categories: Directly Determinable, Root-Cause, and Leads-to CWEs.

A major result shown in this patent document is that the imprecision and the current lack of automation can be directly attributed to two factors. One factor is that many CWEs, as described, do not always lead to what this patent document refers to as a cyber Breachable Event (BE) nor even, sometimes, to what this patent document refers to as a Functional Error (FE). The second factor is that the CWE may be a part of a chain of events, sometimes many steps long, many times involving multiple CWEs, before causing a BE or some other fault (or not). Only through an understanding of when or if an issue causes a BE, and understanding the chain of events that can lead to BE or FE issues can a SAT have its CWE coverage significantly extended.

There are several conditions that should be considered when addressing the computing problem identified herein. Examples of these conditions are Breachable Events, Functional Errors, and Error Free cases.

A Breachable Event (BE) can be a coding situation that can be exploited to gain unauthorized access, deny service, or any of a variety of other hackable consequences. From a CWE perspective, a BE can have one or more system responses of the following common consequences list: access control, execute unauthorized code or commands, bypass protection mechanisms, confidentiality, integrity, read application data, modify application data, gain privileges, assume identity, availability, and denial of service. Note that not all software errors will lead to a BE. For example, an index out-of-bounds error may or may not be hackable, depending on the code situation, compiler, and operating environment. If an out-of-bounds error is just one off and the application uses memory at the one-off location for accessed array is unused, the error will not cause any breachable situation.

A Functional Error (FE) can be a coding situation where the application does something that is incorrect or unintended. For the purposes of this disclosure, it is assumed that Functional Errors are mutually exclusive of BEs. Unlike what are traditionally thought of as functional errors, errors that are BEs are not included in FEs. Here, FEs are incorrect results from the application, not hackable events. This is an important distinction as later analysis shows. From a CWE perspective, functional errors could include one or more of the following system responses: memory corruption, system crash, incorrect answer, resource consumption: excessive memory, resource consumption: excessive work, and system inaction.

Error-free (EF) cases are situations in which the code is performing as expected and all results are correct. There are no run-time errors, FEs, or BEs included in any code situation that is error-free.

Several additional new classifications of CWEs are described herein. Each class of CWEs can be defined by a common set of software and mathematical properties.

The first classification to be presented is called a Directly Determinable CWE. Directly determinable (DD) CWEs are potentially BEs that can be detected directly by a SAT. Less than 20% of CWEs can be classified as a DD CWE.

An example of a DD CWE is an index out of bounds situation. This includes CWE 118 (Incorrect Access of Indexable Resource—'Range Error', CWE 786 (Access Memory Location Before Start of Buffer), CWE 787 (Out-of-bounds Write), and CWE 788 (Access of Memory Location After End of Buffer). The size of an array is determined either upon declaration or through a dynamic allocation request. This size can be used to determine if an index addressing the array is out-of-bounds. When an array is accessed using an index, the potential range of values of the index variable can be determined through source code analysis and the value range can then be compared to the allowed values of the index, based on the array size. If the range of values is beyond the array size, or below the first element, an index out of bounds is determined. Its location and mathematical situation are directly known.

Even though the index out of bounds CWE is directly determinable, it may or may not be a BE. In fact, it may not even lead to a BE. However, an index out of bounds, when not a BE, is always a functional error.

An example of an index out of bounds leading to a BE is a buffer overflow (CWE-120). In some, but not most cases, an index out of bounds may cause a buffer overflow event, which is a CWE that is a BE. However, it will not necessarily cause a buffer overflow. A SAT cannot always determine when an index out of bounds will cause a buffer overflow case since these can be dependent on compiler choice, compiler options, and environment. However, it is important to recognize the converse, which is that if there are no index out of bounds situations in a code base, then there can be no buffer overflows caused by them. Here, with buffer overflows, the source-code analysis can prove the non-existence of a BE (i.e., buffer overflows), yet cannot always directly determine them.

As seen in FIG. 1, a DD CWE, labeled with reference number 110, may or may not be a BE or even lead to a BE, which is labeled with reference number 125. Indeed, in most situations, a DD CWE 110 is not a BE. In such cases, a DD CWE 110 will always be an FE, which is labeled with reference number 120 in FIG. 1. A DD CWE 110 can be primary (that is, the DD CWE 110 itself causes the BE 125 or FE 120), or it can come about from a chain of events, as discussed below.

DD CWEs 110 can be found with three different approaches: (1) based solely on the source code (referred to herein as code-only DD CWEs or CO-DD CWEs), or (2) based on the source code with additional user information (called extra information, directly determinable (XI-DD) CWEs), or (3) based on analysis in conjunction with human judgment (called human judgment, directly determinable (HJ-DD) CWEs). In all three cases, the commonality of all DD CWEs is that their exact position and the mathematical situation of the event can be determined through static source code analysis with no information about the compiler, compiler options, or runtime environment.

The manner in which DD CWEs 110 are determined through source code analysis will now be discussed. Prior art SATs focus on the determination of CO-DD CWEs in source code. However, CO-DD CWEs represent only 37.5% of all DD CWEs or 7.5% of all CWEs (by CWE classification). An example of a CO-DD CWE is the index out of bounds situation described earlier, which is determined by comparing the range of possible index variable values with the size of the array being addressed. The determination of the CO-DD requires only the information that is present within the source code. SATs can utilize a variety of approaches to determine CO-DD CWEs, from formal methods to rule-based analysis.

DD CWEs which require additional user information to detect in software represent an additional 27.5-37.5% of DD CWEs 110 that could be found and fixed. Examples of XI-DD CWE are the MITRE CWEs concerning the bypass of password protection in software. These are CWE 288 (Authentication Bypass Using an Alternative Path or Channel), CWE 305 (Authentication Bypass by Primary Weakness), CWE 306 (Missing Authentication for Critical Function), CWE 592 (Authentication Bypass Issues), and CWE 862 (Missing Authorization). With each of these CWE's a user can either access critical software data or functionality without first undergoing a password-based authorization check. In other words, there exists a backdoor to secure data or application functionality. In order for an automated SAT to detect these issues, two sets of additional information are required from the user. The first set of information identifies either: (1) which routine in the code performs the authentication of a password, or (2) which data variable holds either the password or the authentication result. This set is required for an automated tool to understand where or how authentication is performed in the software. The second set of information identifies the critical data and/or functionality, since this is an application-specific judgment that is not automatible. With these two pieces of information, a SAT can verify whether or not there exists paths in the code which bypass the authentication process and reaches the critical data and/or functionality.

Most current SATs do not address XI-DD CWEs. When they do, the tools do not ask the user for the additional information, but rather try to make intelligent guesses at the additional information, even though this leads to much higher rates of false positive and false negative results. Only with the addition of extra information can a SAT determine XI-DD CWEs without false answers.

The scope of the additional information needed to address all XI-DD CWEs in software is limited. For example, a SAT would need the identification of which data is (1) sensitive and needs to be secure, (2) is a user password, (3) is the pass/fail result of authentication, (4) holds the permission levels for code actions, and (5) is a file or directory name. Some of this information can be determined automatically, in some limited cases. However, in the most general case, the user would need to supply the additional information if the SAT is to detect XI-DD CWEs without false results.

The remaining 20-30% of DD CWEs 110, referred to herein as analysis plus human judgment (HJ-DD CWE) CWEs, require judgment by the user. Current SATs do not address this classification of CWEs. Examples of HJ-DD CWEs are the set of CWEs concerning access control. Access control answers the following question: "for all user actions within an application, does the application properly verify the privilege (or authorization level) of the user to check that the user has a high enough permission level to perform the action?" The privilege and access control functionality correspond to finding the following MITRE CWEs: 250, 264, 265, 266, 267, 268, 269, 270, 271, 272, 273, 274, 280, 284, 286, 648, 653, 657, 1011, and 1015. Proper authorization levels are a judgment of the application designer, hence, the corresponding CWEs are considered HJ-DD CWEs. Currently, there is no automated means to verify access control.

For a SAT to determine access control information, the user would need to specify the variable(s) associated with privilege levels. The SAT can then determine all the code actions that can be done for a given privilege level. The user is then queried for whether the privilege levels are appropriate for each code action.

In general, for HJ-DD CWEs, an analysis tool can show what the code does and guide/prompt the user with the issue. However, the user needs to judge whether the security is sufficient or correct for their particular application. Without the SAT analysis capability for an HJ-DD CWE, it is not possible to ensure the proper security. Without the judgment, it is not possible to automate the determination of correctness.

The second class of CWEs described herein will be called Root-Cause CWEs in this patent document, shown in FIG. 1 with reference numeral 105. Unlike DD CWEs 110, an RC CWE 105 in and of itself is neither an FE 120 nor a BE 125. As such, an RC CWE 105 cannot be found through automated static source code analysis methods without an oracle. An examination of all RC CWEs 105 has found that they share an important common factor: all Root-Cause CWEs 105 start a chain of events in the software under question. The chain of events may lead to BE 125, FE 120, or EF situations. This examination has also shown that where the root cause chain leads to a BE 125, the chain must include one or more DD CWEs 110 before a BE 125 can occur. This result became evident only upon study and mapping of every RC CWE 105 and an understanding of all the possible ways they can occur within software. This inclusion of a directly determinable event (a DD) can be exploited to determine if the software has RC CWEs 105 that result in BE 125 situations.

An example of an RC CWE 105 is the Off-by-one error type CWE (CWE 193). In this example, a variable value, usually a pointer or index value, is incorrect by a value of 1—either one greater or less than the proper value. This usually occurs as indexing to a loop wherein the loop skips either the first or last array element due to the index or pointer value being off by a value of 1. This can lead to events such as an index out of bounds situation (CWE 188, 786, 787, or 788) and cause a BE 125. More likely is that this situation leads to a FE 120, but not a BE 125. It is also important to note that skipping one element of an array could also be done purposely and correctly—thus leading to an EF situation. Since the software developer's purpose is unknown, an automated SAT cannot find an Off-by-one error directly. But since the off-by-one situation does lead to a BE 125, it will be the start of a chain of events that must pass through a DD CWE 110 (such as the index out of bounds situation) and ultimately cause a BE 125 either from the DD CWE 110 event in the chain, or, as defined and discussed later, from continuance of the chain of events to a Leads-to CWE 115.

In general, as shown in FIG. 1, an RC CWE 105 can never directly be a BE 125. An RC CWE 105 may or may not lead to a BE 125. It may or may not be or lead to an FE 120. However, if RC CWE 105 is the root cause of a BE 125, then another directly determinable event (DD CWE 110) must occur before the BE 105 can happen. An RC CWE 105 also cannot be found directly by a SAT, due to many factors, foremost of which is that the CWE may actually be an EF (Error-Free) situation. Automated SATs can only find (some) coding mistakes. These tools cannot find correct software. This list of properties, that are common to all RC CWEs, can uniquely determine which CWEs in the MITRE list are classified as RC CWEs.

Upon study and mapping of every RC CWE 105 and an understanding of all the possible ways they can occur within software, it is possible to prepare a list of all DD CWEs that must be present within event chains from the RC CWE 105 to all possible BE 105 events. This list of intermediate DD CWEs is called in this patent document as a blocking set for the RC CWE, since the RC CWE cannot lead to a BE event without passing through one or more DD CWEs from the blocking set. Alternatively, if no DD CWE from an RC CWE's blocking set is present in a software application, the RC CWE, whether present or not, cannot cause a BE event. Pre-determination that a CWE is within the RC class and its associated blocking set is a pre-requisite for the method to find RC CWE's within software.

The manner in which an RC CWE can be determined in software will now be discussed. As described before, RC CWEs 105 cannot be found directly by a SAT. Determinations can be made for DD CWEs 110. For every RC CWE 105, one or more DD CWEs 110 must occur before the RC CWE 105 can become a BE 125. This set of DD CWEs is known as the blocking set. The blocking set becomes a necessary, but not a sufficient test, for BE's 125 that are caused by an RC CWE 105.

An example is CWE-131 (Incorrect Calculation of Buffer Size). In this CWE, the calculation to determine how much memory to allocate is incorrect, causing less memory to be allocated than expected. In this CWE, this lessened memory allocation leads to a buffer overflow (CWE-120). In such a situation, the buffer overflow cannot occur by itself unless another DD CWE 110, such as index out of bounds (CWE-118, 786, 787, or 788) first occurs (the blocking set). In this manner, the RC CWE 105 (in this case, CWE-131) starts a chain of events, which must pass through one or more DD CWEs 110 before leading to a BE 125. In other words, the correctness of the buffer size cannot be determined when the calculation is made—it is only upon usage of the result of that calculation that the correctness can be determine.

However, in the end, if a SAT determines that there are no blocking set DD CWE events 110 (e.g., index out of bounds) in a piece of code, then that code cannot also have any BE 125 (e.g., buffer overflows) caused by the RC CWE event 105. The end result is that RC CWEs 105 cannot be found directly. However, a SAT can determine the non-existence of an RC CWE 105. If a SAT determines that there are no blocking set DD CWE events 110 in a piece of code, then that code cannot also have any BE 125 caused by the associated RC CWE event 105. Therefore, the non-existence of the RC CWE 105 is determined by proving that there are no instances of a blocking set of related DD CWE events 110.

The third class of CWEs described herein and illustrated in FIG. 1 will be called a Leads-to CWE 115 in this patent document. Like other classifications, Leads-to (LT) CWEs 115 can be defined by a common set of software and mathematical properties, as described below. Every CWE fits into one and only one of the three categories: DD CWE 110, RC CWE 105, or LT CWE 115.

An LT CWE 115 will either be a BE 125 or FE 120. An LT CWE 115 will differ from a DD CWE 110 primarily due to the fact that an automated SAT cannot determine its presence based on the source code alone with known static information. It has been found that the presence of an LT CWE 115 is directly affected by an application's run-time environment, the compiler that is used for the application, and the compiler options, along with other external factors. Due to their tremendous variety, these external factors are beyond the capability of currently available SATs, and thus have required the use of dynamic analysis tools, whose coverage and success is extremely limited due to the size, scope, and costs associated with test case development.

The common factor defining LT CWEs 115, besides not being directly determinable, is that they end a chain of events in the software. In those cases where the LT CWE-ending chain causes a BE 125, the chain must include one or more DD CWEs 110 before the BE 125 could occur. Like the RC CWE 105 result, this was not expected and could only be verified by study of every LT CWE 115 and how they can occur within software. As with RC CWEs 105, the inclusion of a DD CWE 110 can be exploited to determine if the software has LT CWEs 115 that result in BE 125 situations, by pre-determination of a blocking set of DD CWEs 110 for each LT CWE 115.

A classic buffer overflow (CWE-120) is an example of an LT CWE 115. Buffer overflows are not a DD CWE 110, since a SAT cannot directly find all buffer overflows. The reason for this is that in most cases, a classic buffer overflow is compiler and machine dependent. The buffer overflow can be caused by an index or pointer out of bounds situation or a rogue pointer (such as an unset pointer or pointer to an entity that does not currently exist). Thus, there are multiple causes of a potential buffer overflow, each of which may or may not lead to an actual buffer overflow. However, conversely, if there are no causes of the buffer overflow (all DD CWE 110 events), then there is no LT CWE 115 situation.

Consider an example of a rogue pointer causing a buffer overflow. As is understood, a rogue pointer may or may not cause a buffer overflow. A SAT cannot determine whether a rogue pointer will cause a buffer overflow, as whether a buffer overflow will occur is dependent on the compiler, OS, environment and exact run-time machine operations. However, the converse statement can be made: A SAT may be able to identify all usage of a rogue pointer. If no rogue pointers are found in a system, then that source of a buffer overflow does not exist. By ensuring that no potential sources of a buffer overflow exist, then there will be no buffer overflows.

The properties of an LT CWE 115 are as follows. Whenever an LT CWE 115 is in a chain to a BE 125, the chain will have one or more DD CWE 110 situation(s) prior to the LT CWE 115. Alternatively, if there are no DD CWE 110 situations prior to a LT CWE 115, the LT CWE 115 will be an FE 120 and not a BE 125.

The manner in which LT CWE 115 can be determined is as follows. Consider CWE-680 (Integer Overflow to Buffer Overflow). In this CWE, the calculation to determine how much memory to use has an integer overflow that causes less memory to be allocated than expected. This reduced memory allocation leads to a buffer overflow. This CWE is blocked by CWE-190 (Integer Overflow), which is a DD CWE 110. If a SAT determines that there are no integer overflows in a piece of code (i.e., no CWE-190s), then that code cannot also have CWE-680 in it, since by definition of CWE-680, the cause of the buffer overflow must be an integer overflow.

The relationship between CWEs and chains of events will now be discussed. It is first noted that a particular CWE may or may not be part of chains of events. Both situations will be discussed. When an RC CWE 105 is not in a chain of events, but, rather, occurs by itself, the RC CWE 105 will not be a BE 125. Instead, the RC CWE 105 will either be an FE 120 or EF case. When a DD CWE 110 is not in a chain of events, it will either be a BE 125 or FE 120 event. When an LT CWE 115 is not in a chain of events, it will be either a FE 120 or EF case.

A chain of events can start with either an RC CWE 105 or DD CWE 110 event. When the chain starts with an RC CWE 105, the chain will result in a BE 125 event only if there is a DD CWE 110 in the chain. Otherwise, the situation will be an FE 120 or an EF event. When the chain begins with a DD CWE 110 event, the chain will always end in a BE 125 or FE 120 situation. Additionally, if the DD CWE 110 starting chain ends with an LT CWE 115, it must be a BE 125 situation.

Chains can end with a DD CWE 110 or an LT CWE 115. If the chain ends with an LT CWE 115, it will be a BE event 125. If the chain ends with a DD CWE 110 event, it will be either a BE 125 or FE 120 event. Additionally, if the DD-CWE ending chain starts with a RC CWE, it must lead to a BE 125 event.

Figure 2:
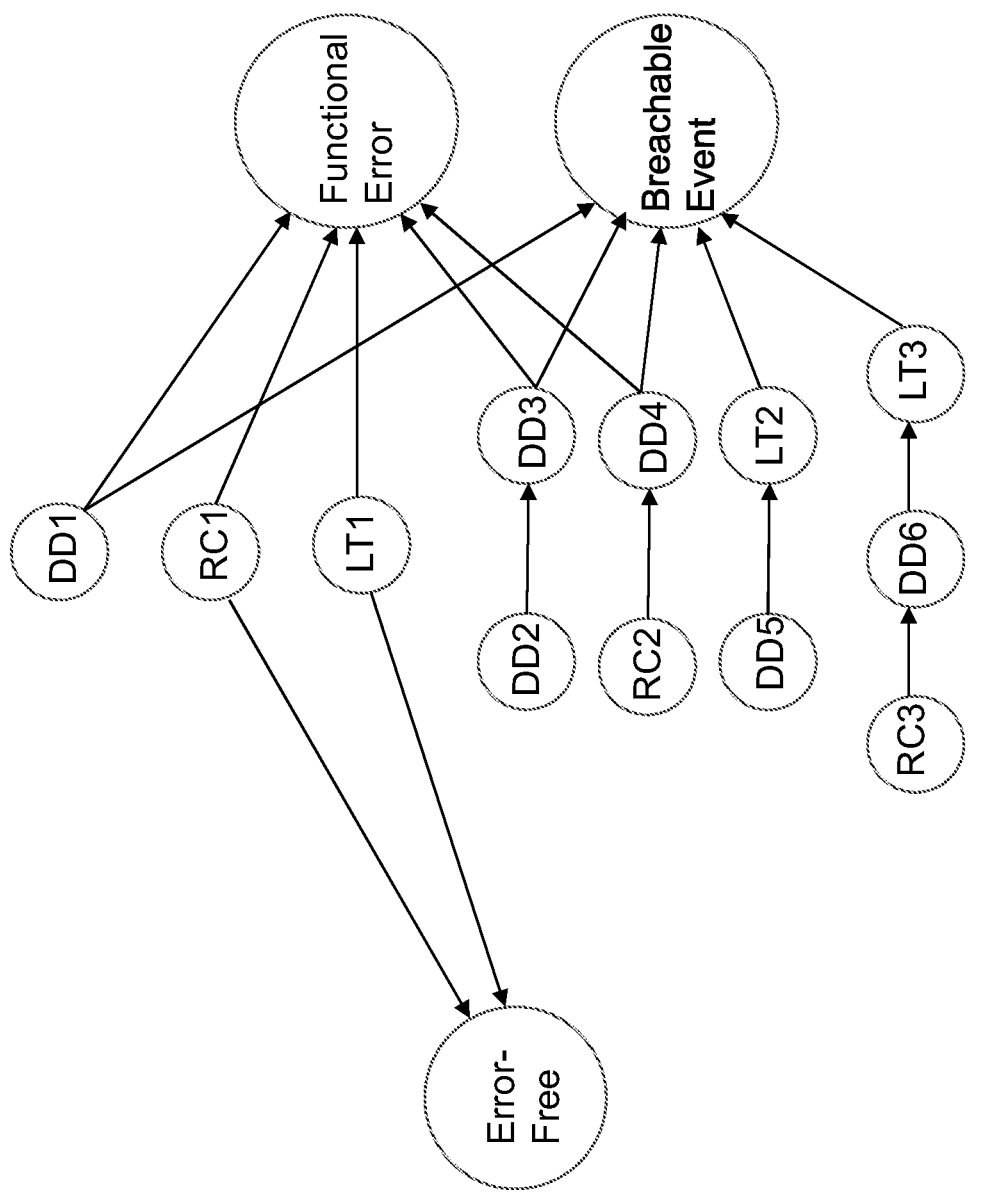
FIG. 2 is state diagram showing how chains of variously classified CWEs lead to breachable events, functional errors or error free operation.
Figure 3:
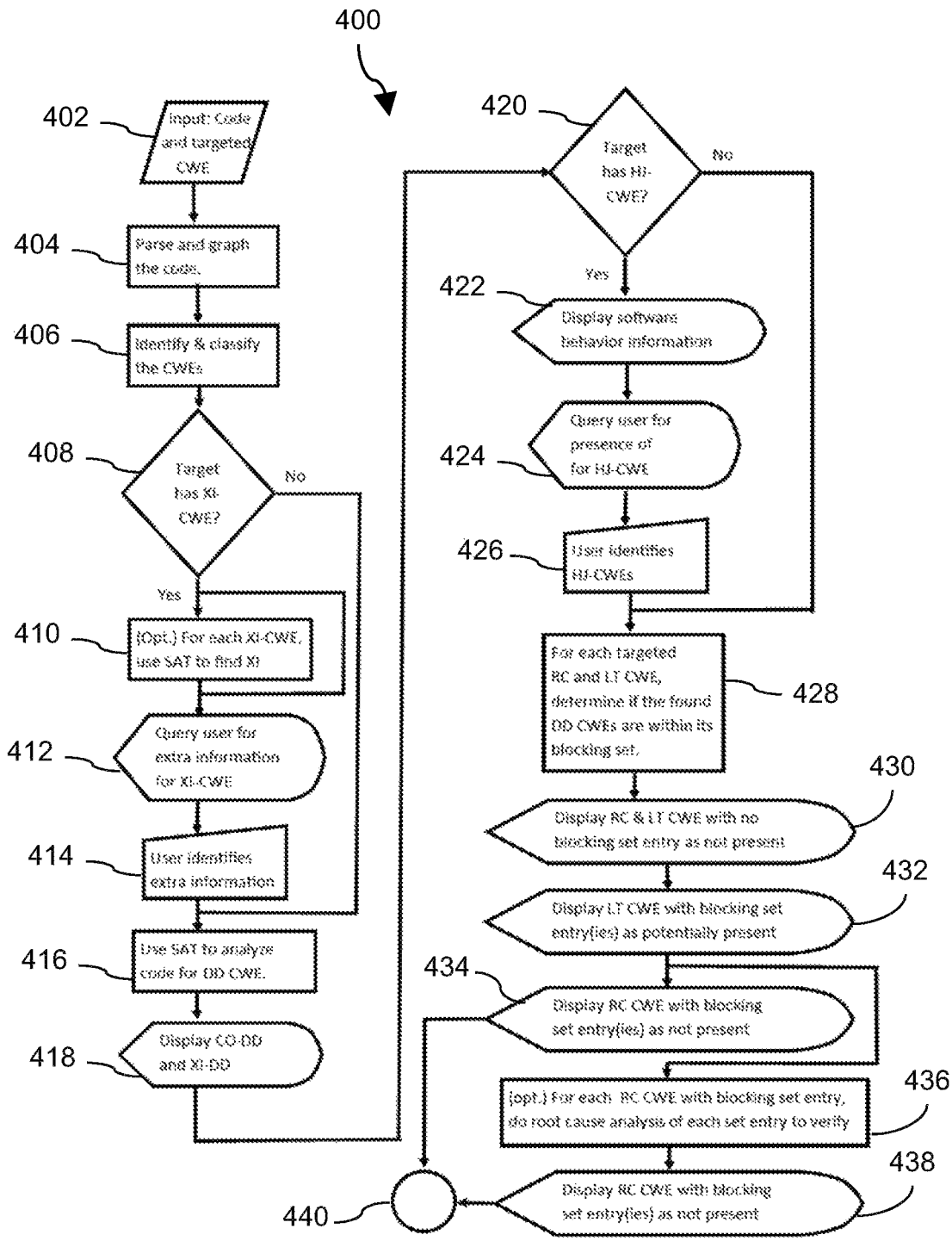
FIG. 3 is a flow chart illustrating an embodiment of the methods described in this patent document.

The relationship between CWEs and chains of events is illustrated in FIG. 2. As can be seen, a chain of events that starts with DD CWE DD2 and ends with DD CWE DD3 results in either FE 120 or BE 125.

A chain of events that starts with RC CWE RC2 that includes DD CWE DD4 results in either FE 120 or BE 125.

A chain of events that starts with DD CWE DD5 and ends with LT CWE LT2 results in BE 125.

A chain of events that starts with RC CWE RC3 that includes DD CWE DD6 and ends in LT CWE LT3 results in either FE 120 or BE 125.

Current SATs typically have well under 10% coverage in finding CWEs while also having a large number of false positives. There are several factors that cause this limited coverage. One coverage issue is that many tools are written for C/C++ and/or Java, whereas the CWE list involves many more languages. However, the primary factor is not language coverage.

Current SATs generally try to cover the code only (CO) DD CWEs that do not require additional user information or user guidance. The inventor has found that DD CWEs represent less than 20% of all CWEs. Further restricting DD CWEs to those that require no additional information, that is the CO-DD CWEs, reduces the 20% maximum coverage to 7.5% (37.5% of 20%). The source code with additional user information (XI) DD CWEs represent 27.5% to 37.5% of DD CWEs and need the additional information to be fairly mathematically exact and have no false positives or negatives. If higher rates of false positives and negatives are accepted, as with many tools, some of this set of XI-DD CWEs could be covered. Several tools do try to cover some of this set (by making some intelligent guesses at the additional information), even though the false positive and negative rates would be higher than the CO-DD CWEs. The same intelligent-guess approach can be used for some LT CWEs. In the end, these approaches will still be limited to less than 10% coverage of CWEs.

Limited coverage is even seen with the NIST-produced Juliet test suite for checking SAT capabilities. The Juliet test suite covers less than 14% of CWEs. In the case of Juliet, a part of this limited coverage is due to the fact that many CWEs are language-dependent. Juliet is designed for only C/C++ and Java. Another issue is that the Juliet test suite tends to focus on CO-DD CWEs. Since Juliet consists of test cases and not discovery techniques, the test suites do include some XI-DD CWEs. Juliet does not include analysis with human judgment (HJ) DD CWEs. Also, for the most part, the test suite does not utilize chains of events, and as such cannot consider RC or LT CWEs.

The largest issue in the detection of CWEs is the fact that over 80% cannot be directly determined. However, it has been determined that for each RC CWE and LT CWE, there exists a set of DD CWEs from which one or more DD CWEs must be present in an event-chain that causes the RC CWE or LT CWE to result in a BE. A SAT with a low false negative rate can prove that a set of DD CWEs is not present in a code base by utilizing the disclosed method. When this set of CWEs is a blocking set for an RC CWE or an LT CWE, that RC CWE or LT CWE also cannot cause a BE in the code base.

Lastly, it should be noted that with use of a SAT with a root cause analysis capability, it is possible to determine some RC CWEs, based on a root-cause analysis of a DD CWE from an RC CWE blocking set. There would also be additional RC CWEs that could be determinable by a SAT-user from the root cause analysis information. However, the most expedient means to ensure that there are no CWEs is the determination and removal of all DD CWEs.

The presently preferred method for finding breachable CWE events in software code 400 will now be described, with particular reference to FIG. 4. This method determines all breachable CWE violations. In the presently preferred method, the MITRE-defined CWEs are assumed to have been classified as either a DD CWE 110, an RC CWE 105, or an LT CWE 115. Furthermore, DD CWEs 110 are assumed to have been further classified as (1) needing no user information (CO-DD CWE), (2) requiring extra information from the user (XI-DD CWE), or (3) requiring human judgment (HJ-DD CWE). Information queries required to determine XI-DD CWEs are assumed to have been pre-determined. The software behavior information required to send to the user to determine HJ-DD CWEs have also been pre-determined. The DD CWE blocking sets for all RC CWEs and LT CWEs have been determined. The mapping of the CWE dependencies show that this set of information can always be pre-determined.

As a first step 402, the source, object, or binary code, sometimes referred to as the software under analysis (SUA), is input. At step 402, a targeted set of CWEs to be found is optionally input. The target set is a subset of the MITRE CWE list that is either (1) of interest by the user, (2) supported by the implementation of the method, or (3) could be present in the SUA. Note that some CWE are language or application-specific, as such they are not amenable to all code. These targeted CWEs would include targeted DD CWEs, along with targeted RC CWEs and/or LT CWEs with their associated blocking sets of DD CWEs.

At step 402, the SUA is parsed to obtain code information needed to perform a static analysis of SUA, and, if needed, a graph representation of the SUA is made to capture the causal relationships amongst the found CWEs. The parsing and graph process may be able to reduce the targeted CWE list by determining that some CWEs are not applicable to the SUA. At step 406, each of the targeted CWEs in the SUA is classified as either a DD CWE 110, an RC CWE 105 or a LT CWE 115. Then, at step 408, the method determines whether the targeted CWE list contains any XI-DD CWEs. If the targeted CWE list contains no XI-DD CWEs, the method can advance to step 416 (to be discussed below). However, if the targeted CWE list contains an XI-DD CWE, the method can optionally advance to step 410. In step 410, for each targeted XI-DD CWE, a SAT examines the code base for any determinable extra information. Step 410 is performed for targeted CWEs that are either: (1) XI-DD CWEs or (2) are RC CWEs or LT CWEs that have blocking sets that include XI-DD CWEs. Another optional step, step 412, queries a user to identify any non-determinable extra information for targeted XI-DD CWEs. At step 414, the user identifies the non-determinable extra information for targeted XI-DD CWEs which were queried at step 412. Optional steps 412-414 can be performed if the targeted CWEs are either: (1) XI-DD CWEs or (2) are RC CWEs or LT CWEs that have blocking sets that include XI-DD CWEs.

Next, at step 416, a static analysis of the code base of the SUA is performed to find any breachable DD CWEs. The static analysis can be based on formal methods, such as abstract interpretation, data flow analysis, Hoare logic, model checking, and symbolic execution. Any formal method is applicable to step 416. In addition, some of the more comprehensive rule-based SATs could be used for step 416. In step 416, either all the DD CWEs or only a targeted set of DD CWEs are sought and found. If only targeted DD CWEs are sought, only the targeted DD CWEs and/or DD CWEs from blocking sets of targeted RC CWEs or LT CWEs will be included.

At step 418, the CO-DD CWEs and the XI-DD CWEs that were found in the code base of the SUA by step 416 can be reported to the user. Such reporting can be in the form of display on a computer monitor or any other form of visual reporting known in the art.

Next, at step 420, the method determines whether the targeted CWE list contains any HJ-DD CWEs. If there are no targeted HJ-DD CWEs, the method advances to step 428 (discussed below). If at step 420 there are targeted HJ-DD CWEs, at step 422, the pertinent software behavior information, as found by the analysis, typically in the form of variable data values at various code locations is presented to the user so that the user can determine whether the HJ-DD CWE is a breachable event. Such reporting of HJ-DD CWEs can be in the form of display on a computer monitor or any other form of visual reporting known in the art. At step 424, the method queries the user as whether the HJ-DD CWE that was found (step 420) and reported at step 422 will lead to a breachable event. Then, at step 426, the user identifies the HJ-DD CWEs.

Step 426 is needed if the targeted CWEs are either: (1) HJ-DD CWE, or (2) RC CWE or LT CWE that have blocking sets that include HJ-DD CWEs.

Once any HJ-DD CWEs in the SUA are identified in step 426, the method then advances to step 428 (or if the SUA did not contain any HJ-DD CWEs, step 428 is invoked after step 420). Step 428 determines the non-presence of targeted RC CWE and LT CWE. In step 428, for each targeted RC CWE and LT CWE, compare the CWE's associated blocking set with the CO-DD CWEs, XI-DD CWEs, and HJ-DD CWEs found in steps 416 and 426. If a DD CWE from an associated blocking set has been found, then the corresponding RC CWE or LT CWE may be present in the SUA. If no DD CWEs from an associated blocking set were found, then the corresponding RC CWE or LT CWE cannot be present in the SUA.

At step 430, each targeted RC CWE and LT CWE with no found DD CWEs from their associated blocking set is reported to the user as not present in the SUA. Otherwise, at step 432 and 434, the method reports the RC CWE and/or LT CWE as potentially being present in the code base.

The method then either advances to step 440 (discussed below), or optionally, advances to step 436, in which a root cause analysis is performed on each and every found DD CWE from every associated blocking set from every found targeted RC CWE from step 428. This is done to verify the presence of the RC CWE. If during step 436, it is determined if the RC CWE is a precursor in a chain of events to a DD CWE. If not, the RC CWE will not lead to a breachable event. This is reported to the user at step 438. However, as mentioned, steps 436-438 are optional.

Finally, by step 440, all targeted DD, RC and/or LT CWEs are determined from the chosen source, object, or binary software. Step 416 determines if the targeted CO-DD CWEs and XI-DD CWEs are present in the SUA. Step 426 determines if the targeted HJ-DD CWEs are present. Step 428 determines the non-presence of the targeted RC CWEs and LT CWEs. Step 436 refines and verifies the presence of targeted RC CWEs.

The above description and drawings are only to be considered illustrative of specific embodiments, which achieve the features and advantages described herein. Modifications and substitutions to specific process conditions can be made. Accordingly, the embodiments in this patent document are not considered as being limited by the foregoing description and drawings.

The invention claimed is:

1. A method for finding security weaknesses in a software program, the method comprising:

reading the software program into memory of a processing device comprising a software analysis tool;

parsing software code of the software program to create parsed code, the parsed code including code information needed to perform a static analysis using the software analysis tool, wherein the software analysis tool is configured to identify security weaknesses described in terms of common weakness enumerations (CWEs);

performing a static analysis of the parsed code to determine a set of target CWEs to discover;

identifying each CWE in the set of target CWEs to be either a code-only CWE (CO CWE), a root-cause CWE (RC CWE), or a leads-to CWE (LT CWE), wherein each LT CWE comprises a final CWE in a chain of events that also includes at least one CO CWE or RC CWE, wherein the set of target CWEs include at least a first RC CWE and a first LT CWE;

identifying a first blocking set of CWEs for the first RC CWE, wherein the first blocking set of CWEs for the first RC CWE comprises at least one CO CWE;

identifying a second blocking set of CWEs for the first LT CWE, wherein the second blocking set of CWEs for the first LT CWE comprises at least one CO CWE, and wherein the second blocking set of CWEs for the first LT CWE is associated with an RC CWE in the set of target CWEs;

performing a static analysis of the parsed code to find each CO CWE in the software code, thereby creating a list of CO CWEs in the software code;

reporting the list of CO CWEs to a user on a user interface;

determining whether at least one CO CWE in the list of CO CWEs is within the first blocking set of CWEs for the first RC CWE;

determining whether at least one CO CWE in the list of CO CWEs is within the second blocking set of CWEs for the first LT CWE;

reporting the first RC CWE or the first LT CWE as not present responsive to a determination that no CO CWE in the list of CO CWEs is within the first blocking set of CWEs or the second blocking set of CWEs; and reporting the first RC CWE or the first LT CWE as potentially present responsive to a determination that at least one CO CWE in the list of CO CWEs is within the first blocking set of CWEs or the second blocking set of CWEs.

2. The method of claim 1, wherein performing the static analysis of parsed code to determine the set of target CWEs to discover comprises performing a formal methods static analysis of the parsed code to determine the set of target CWEs to discover.

3. The method of claim 1, wherein identifying each CWE in the set of target CWEs further comprises determining whether the software code includes an extra information, directly determinable CWE (XI-DD CWE), the method further comprising:

querying the user for additional information associated with the XI-DD CWE.

4. The method of claim 3, further comprising:

analyzing the parsed code for additional information associated with XI-DD CWEs to determine the presence of XI-DD CWEs.

5. The method of claim 4, the method further comprising:

prompting the user to verify the additional information associated with the XI-DD CWEs.

6. The method of claim 1, the method further comprising graphing the software code for additional accuracy of the static analysis of the parsed code.

7. The method of claim 1, wherein performing the static analysis of the parsed code further comprises:

identifying software behavior associated with a targeted human judgment, directly determinable CWE (HJ-DD CWE);

querying the user for the presence of a HJ-DD CWE based upon the determined software behavior; and recording the discovery of at least one user-determined HJ-CWE.

8. The method of claim 1, wherein reporting the first RC CWE or the first LT CWE as potentially present includes reporting the first LT CWE as potentially present.

9. The method of claim 1, wherein reporting the first RC CWE or the first LT CWE as potentially present includes reporting the first RC CWE as potentially present.

10. The method of claim 9, the method further comprising:

graphing the software code of the software program to create a causal graph;

identifying one or more CO CWEs in the list of CO CWEs that are found within the first blocking set of CWEs for the first RC CWE;

performing a root cause analysis, based on the causal graph, for each of the one or more CO CWEs; and reporting each RC CWE identified by the root cause analysis.

* * * * *